United States Patent [19]

Onuma

[11] Patent Number: 5,381,049

[45] Date of Patent: Jan. 10, 1995

[54] POWER SUPPLY APPARATUS FOR A SYSTEM COMPOSED OF PLURAL ELECTRONIC UNITS

[75] Inventor: Hideki Onuma, Kanagawa, Japan

[73] Assignee: Sony Corporation, Tokyo, Japan

[21] Appl. No.: 243,043

[22] Filed: May 16, 1994

Related U.S. Application Data

[63] Continuation of Ser. No. 888,499, May 27, 1992, abandoned.

[30] Foreign Application Priority Data

Jun. 7, 1991 [JP] Japan .................................. 3-163474

[51] Int. Cl.⁶ .................................................. H02J 3/00
[52] U.S. Cl. .......................................... 307/86; 348/730
[58] Field of Search .................... 307/36, 38, 40, 41, 307/42, 141, 141.4, 139, 85, 86, 87; 348/730-734, 778

[56] References Cited

U.S. PATENT DOCUMENTS 4,471,232  9/1984  Peddie et al. ........................ 307/40
4,509,211  4/1985  Robbins ............................. 358/194.1

*Primary Examiner*—Jeffrey A. Gaffin
*Assistant Examiner*—Peter Ganjoo
*Attorney, Agent, or Firm*—Jay H. Maioli

[57] ABSTRACT

A multibillboard system has a matrix of display monitors for displaying an image on a single screen. Electric energy from a power supply is supplied through a main power supply switch to the display monitors. In response to a power-on remote control signal, the electric energy from the main power supply switch is supplied to the display monitors to energize them successively with respective different time delays. Since the display monitors are energized successively, not simultaneously, any rush current flowing to the multibillboard system is reduced when the multibillboard system is turned on.

6 Claims, 2 Drawing Sheets

POWER SUPPLY APPARATUS FOR A SYSTEM COMPOSED OF PLURAL ELECTRONIC UNITS

This is a continuation of application Ser. No. 07/888,499 filed May 27, 1992, now abandoned.

BACKGROUND OF THE INVENTION

1. Field of the Invention

The present invention relates to a power supply apparatus for use with a multiple-unit system composed of a plurality of electronic units such as a plurality of display monitors.

2. Description of the Prior Art

There is known a multiple-unit image display system composed of a plurality of display monitors for jointly providing a single screen for displaying images. Such a multiple-unit image display system will hereinafter be referred to as a "multibillboard system".

FIG. 1 of the accompanying drawings shows a conventional multibillboard system. The multibillboard system, generally designated by the reference numeral 1, comprises a matrix of connected display monitors 2A, 2B, 2C, 2D, ..., with four display monitors in each vertical column and four display monitors in each horizontal row. Each of the display monitors 2A, 2B, 2C, 2D, ... is supplied with an image signal depending on the two-dimensional position of the display monitor in the multibillboard system.

In the illustrated multibillboard system, the total of sixteen display monitors 2A, 2B, 2C, 2D, ... jointly provide a single large image screen for displaying images thereon.

When all the display monitors 2A, 2B, 2C, 2D, ... are energized simultaneously by a power supply apparatus, a large rush current flows from the power supply apparatus to the multibillboard system. If the number of connected display monitors 2A, 2B, 2C, 2D, ... increases, then an overcurrent protector or a circuit breaker associated with the multibillboard system may be actuated when the rush current is supplied from the power supply apparatus. When the circuit breaker is actuated, the multibillboard system cannot readily be energized or switched into operation.

One solution would be to turn on the display monitors 2A, 2B, 2C, 2D, ... successively one by one. However, such a process of energizing the multibillboard system would be tedious and time-consuming, making the multibillboard system inconvenient to use.

OBJECTS AND SUMMARY OF THE INVENTION

In view of the aforesaid drawback of the conventional power supply apparatus for multiple-unit systems, it is an object of the present invention to provide a power supply apparatus which can reduce a rush current supplied to a multiple-unit system when the multiple-unit system is turned on.

According to the present invention, there is provided a power supply apparatus for energizing a multiple-unit system composed of a plurality of electronic units, comprising establishing means for establishing a plurality of different time delays, receiving means for receiving a remote control signal, and control means responsive to the remote control signal for energizing the electronic units successively with the different time delays.

According to the present invention, there is also provided a system comprising a matrix of display monitors for displaying an image on a single screen, and a main power supply switch for supplying electric energy to the display monitors, each of the display monitors comprising establishing means for establishing a time delay, receiving means for receiving a remote control signal, and control means responsive to the remote control signal for supplying the electric energy from the main power supply switch to energize the display monitor with the time delay. The establishing means of the display monitors establish different time delays, respectively, for the display monitors. Since the display monitors are energized successively, not simultaneously, any rush current flowing to the system is reduced when the system is turned on.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 2:
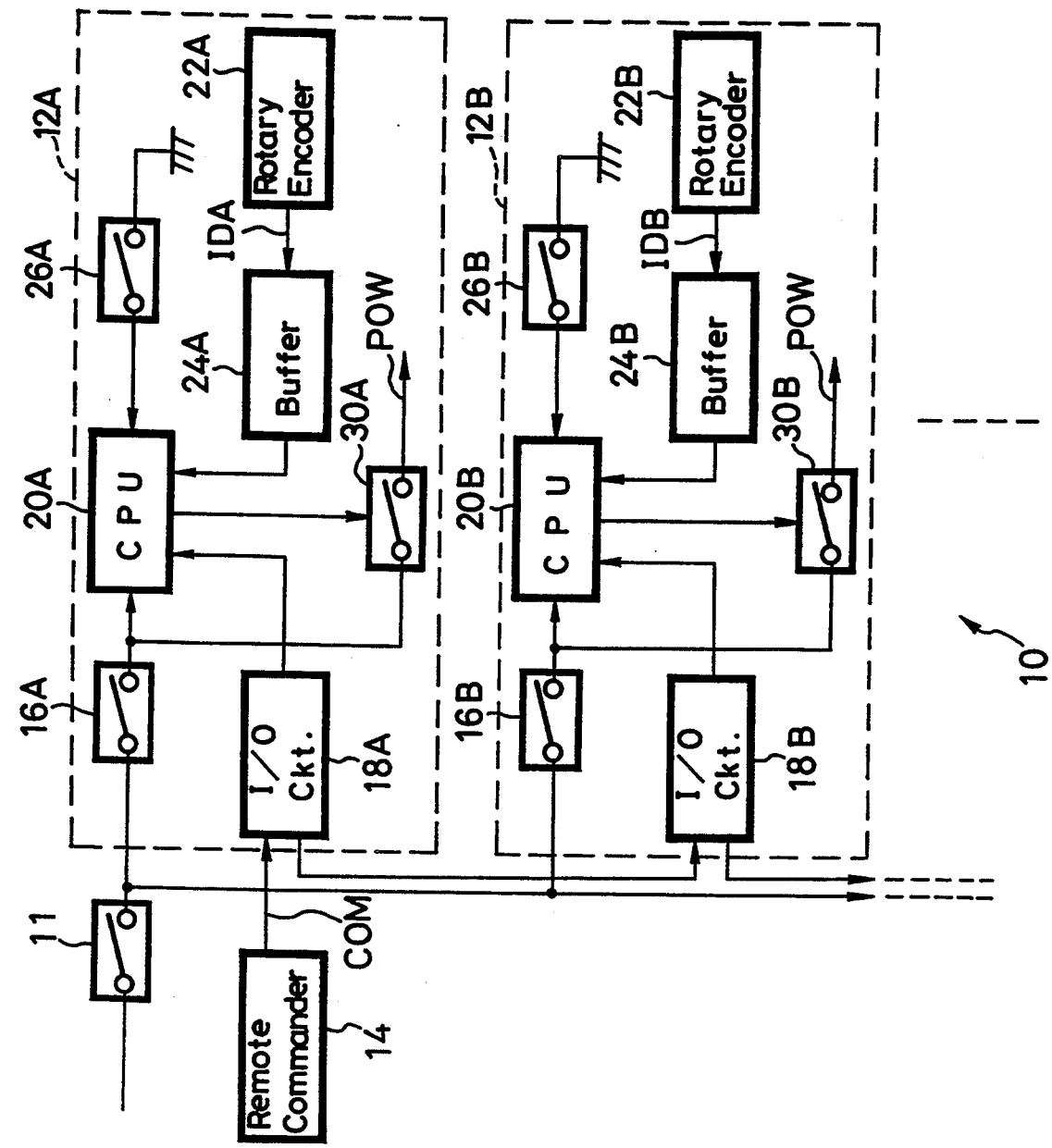
FIG. 2 is a block diagram of a multibillboard system combined with a power supply apparatus according to the present invention.

FIG. 2 shows, in block form, a multibillboard system combined with a power supply apparatus according to the present invention.

The multibillboard system, generally designated by the reference numeral 10 in FIG. 2, comprises a total of sixteen display monitors 12A, 12B, ... which may be arranged in a matrix of four columns and four rows. The display monitors 12A, 12B, ... are identical in structure to each other. Electric energy is supplied from a power supply to the display monitors 12A, 12B, ... through a main power supply switch 11.

A remote control signal COM is supplied from a remote control unit or commander 14 to the first display monitor 12A, from which the supplied remote control signal COM is transferred successively to the other display monitors 12B, ... through cables. Therefore, the display monitors 12A, 12B, ... can be controlled in operation by the remote control signal COM from the remote commander 14.

The display monitors 12A, 12B, ... are supplied with the electric energy from the power supply through respective auxiliary power supply switches 16A, 16B, ... which are connected to the main power supply switch 11. The auxiliary power supply switches 16A, 16B, ... are turned on when or after the main power supply switch 11 is turned on.

The display monitors 12A, 12B, ... have respective input/output circuits 18A, 18B, ... which receive the remote control signal COM. The input/output circuits 18A, 18B, ... transmit the remote control signal COM to central processing units (CPU) 20A, 20B, ... of the respective display monitors 12A, 12B, ..., and also transfer the remote control signal COM to the respective input/output circuits 18B, ... of the following display monitors 12B, ...

Therefore, when any desired number of display monitors 12A, 12B, . . . are employed, they can easily be remotely controlled using the remote commander 14 after their input/output circuits 18A, 18B, . . . are interconnected successively in series.

The CPUs 20A, 20B, . . . read settings from respective rotary encoders 22A, 22B, . . . through respective buffers 24A, 24B, . . . to introduce index numbers IDA, IDB that are allotted to the respective display monitors 12A, 12B, . . . The index numbers IDA, IDB, . . . are identification numbers that the user of the multibillboard system 10 can set for the respective display monitors 12A, 12B, . . . . In this embodiment, numbers ranging from "00" to "99" are assigned as the index numbers IDA, IDB, . . . to the respective display monitors 12A, 12B, . . .

Consequently, the multibillboard system 10 can be composed of up to one hundred display monitors 12A, 12B, . . . which may be combined freely.

The CPUs 20A, 20B, . . . read the remote control signal COM from the respective input/output circuits 18A, 18B, . . . based on the index numbers IDA, IDB, . . . , and then output control signals to image signal processors (not shown) based on the remote control signal COM.

The user can control the display monitors 12A, 12B, . . . independently by operating the remote commander 14 using the respective index numbers IDA, IDB, . . . , and hence can easily adjust the display monitors 12A, 12B, . . . with the remote commander 14.

In reality, after the display monitors 12A, 12B, . . . have been connected, the user may want to select an adjusting mode for display monitors 12A, 12B, . . . , and adjust the color temperature, contrast, brightness, and other display image attributes or qualities of the display monitors 12A, 12B, . . . in the adjusting mode. In such a case, the user operates on the remote commander 14 to control the display monitors 12A, 12B, . . . individually for adjusting them to achieve desired display image qualities. The adjusting process of the overall multibillboard system 10 can therefore easily be performed.

When the remote commander 14 is operated to transmit a remote control signal COM for energizing the display monitors 12A, 12B, . . . , and such a remote control signal COM is supplied to the CPUs 20A, 20B, . . . , the CPUs 20A, 20B, . . . determine whether respective mode setting switches 26A, 26B, . . . are turned on or not. If the mode setting switches 26A, 26B, . . . are turned on, then the CPUs 20A, 20B, . . . execute an operation sequence shown in FIG. 3. The energization of the overall multibillboard system 10 can thus be controlled using the remote commander 14.

Figure 1:
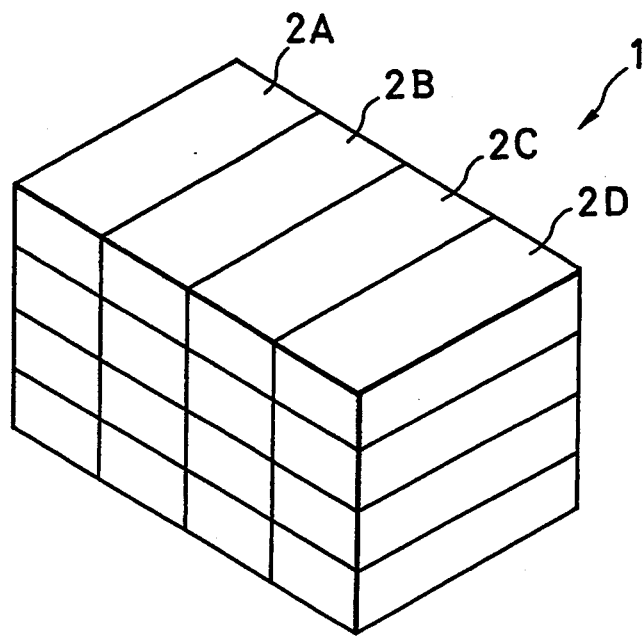
FIG. 1 is a schematic perspective view of a conventional multibillboard system.
Figure 3:
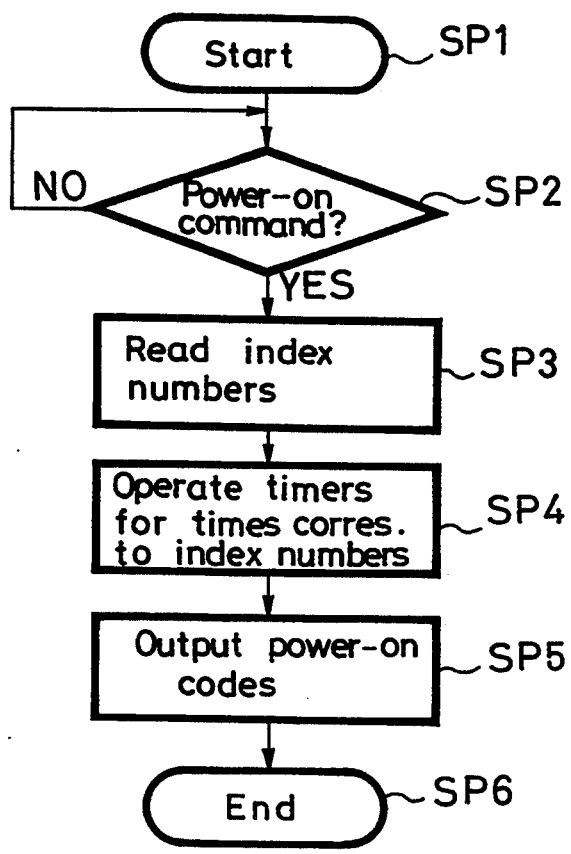
FIG. 3 is a flowchart of an operation sequence of the power supply apparatus according to the present invention.

As shown in FIG. 3, when the operation sequence is started in a step SP1, the CPUs 20A, 20B, . . . determine whether they have received a remote control signal COM for energizing the display monitors 12A, 12B, . . . , i.e., a power-on remote control signal COM, or not in a step SP2. If not, then the CPUs 20A, 20B, . . . repeat the step SP2 until they receive a power-on remote control signal COM. If the CPUs 20A, 20B, . . . have received a power-on remote control signal COM in the step SP2, then control goes from the step SP2 to a step SP3.

In the step SP3, the CPUs 20A, 20B, . . . read the index numbers IDA, IDB, . . . from the respective rotary encoders 22A, 22B, . . . . Thereafter, the CPUs 20A, 20B, . . . start to operate respective timers for periods of time depending on the index numbers IDA, IDB, . . . , respectively.

More specifically, the CPU 20A to which the index number IDA of "00" is assigned operates the associated timer for a period of two seconds. The CPU 20B to which the index number IDB of "01" is assigned operates the associated timer for a period of four seconds, which is two seconds longer than the timer associated with the CPU 20A. Likewise, the CPU 20C (not shown) to which the index number IDC of "02" is assigned operates the associated timer for six seconds, and the CPU 20D (not shown) to which the index number IDD of "03" is assigned operates the associated timer for eight seconds.

The CPUs 20A, 20B, . . . control the respective display monitors 12A, 12B, . . . to be energized, i.e., supplied with the electric energy from the power supply, with respective time delays depending on the index numbers IDA, IDB, . . . that are allotted to the respective display monitors 12A, 12B, . . . .

Specifically, when the timers complete their operation, i.e., when they have operated for the respective periods of time, the CPUs 20A, 20B, . . . apply power-on codes to respective switches 30A, 30B, . . . which are connected to the respective auxiliary power supply switches 16A, 16B, . . . , for thereby turning on the switches 30A, 30B.

Therefore, the electric energy from the main power supply switch 11 and hence the auxiliary power supply switches 16A, 16B, . . . can be supplied through the respective switches 30A, 30B, . . . as power supply energy POW to main control circuits (not shown) of the respective display monitors 12A, 12B, . . . with time delays corresponding to the respective index numbers IDA, IDB, . . . . The display monitors 12A, 12B, . . . can thus automatically be switched on or energized successively with those time delays without the user's having to operate on the remote commander 14 for the energization of each of the display monitors 12A, 12B, . . . . As a result, the rush current flowing when the multibillboard system 10 is turned on can be reduced.

After the CPUs 20A, 20B, . . . have issued the power-on codes to the switches 30A, 30B, . . . , the process of energizing the display monitors 12A, 12B, . . . are ended in a step SP6.

If the mode setting switches 26A, 26B, . . . are not turned on, then the CPUs 20A, 20B, . . . apply the power supply energy POW to all the main control circuits immediately when the power-on remote control signal COM is applied to the CPUs 20A, 20B, . . . .

Rather than setting time delays on the side of the respective display monitors 12A, 12B, . . . , the user may set respective time delays on the remote commander 14, and the display monitors 12A, 12B, . . . may be successively energized with the time delays thus established. With the time delays set on the remote commander 14, however, since the remote commander 14 is required to operate for energizing the multibillboard system 10 in a different fashion depending on the number of display monitors 12A, 12B, . . . that are interconnected, the multibillboard system 10 is subject to a certain limitation with respect to the use of the remote commander 14.

According to the illustrated embodiment, the time delays are established on the side of the respective display monitors 12A, 12B, . . . using the rotary encoders 22A, 22B, . . . as described above. Therefore, even when the number of interconnected display monitors 12A, 12B, . . . is varied, the remote commander 14 can be used in the same fashion in combination with those display monitors 12A, 12B, . . . , making the multibillboard system 10 convenient to use .

The time delays can simply be established depending on the index numbers IDA, IDB, . . . using the rotary encoders 22A, 22B, respectively. Since no separate means for establishing the time delays is required, the display monitors 12A, 12B, . . . are relatively simple in arrangement.

The rotary encoders 22A, 22B, . . . and the buffers 24A, 24B, . . . serve as means for setting index numbers IDA, IDB, . . . assigned to the respective display monitors 12A, 12B, . . . and means for establishing time delays for which the energization of the respective display monitors 12A, 12B, . . . is to be delayed, based on the index numbers IDA, IDB, . . .

In the multibillboard system 10 described above, when the remote commander 14 is operated on to apply a power-on remote control signal COM, the CPUs 20A, 20B, . . . of the respective display monitors 12A, 12B, . . . read the index numbers IDA, IDB, . . . set by the respective rotary encoders 22A, 22B, . . . , and energize the respective display monitors 12A, 12B, . . . with time delays corresponding to the index numbers IDA, IDB, . . . . Since the display monitors 12A, 12B, . . . are energized or turned on successively with the time delays, rather than simultaneously, the rush current that flows from the power supply to the multibillboard system 10 is reduced when the multibillboard system 10 is turned on.

In the illustrated embodiment, the display monitors 12A, 12B, . . . are successively energized with the time delays of two seconds. However, the display monitors 12A, 12B, . . . may be successively energized with any desired time delays which may freely be selected.

While the display monitors 12A, 12B, . . . are successively energized one by one in the above embodiment, they may be energized in successive groups each comprising a practically allowable number of display monitors which causes no serious rush current problem. In such a modification, the display monitors belonging to one group are assigned the same index number so that they will be energized with the same time delay.

The time delays for which the energization of the respective display monitors 12A, 12B, . . . is to be delayed may be selected using other time delay establishing means than the rotary encoders 22A, 22B, . . . and the buffers 24A, 24B, . . . .

The present invention has been illustrated as being applied to a power supply apparatus for use with a multibillboard system composed of plural display monitors. However, the principles of the present invention are also applicable to a power supply apparatus for use with any of various multiple-unit systems each composed of a plurality of electronic units.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A power supply apparatus for energizing a multiple-unit system composed of a plurality of electronic units, comprising:
    establishing means for establishing a plurality of different time delays and including a plurality of encoders each mounted on a respective one of said plurality of electronic units and each encoder being operable by a user of the system to select a different time delay for respective one of the plurality of electronic units;
    receiving means for receiving a remote control signal; and
    control means responsive to said remote control signal and connected to said establishing means for energizing the electronic units successively at different times corresponding to said different time delays.

2. A power supply apparatus according to claim 1, wherein said plurality of encoders set a respective plurality of index numbers assigned respectively to the plurality of electronic units, and said control means forms the different time delays depending on said index numbers.

3. A power supply apparatus according to claim 1, wherein said receiving means comprises a plurality of interconnected input/output circuits associated with the plurality of electronic units, respectively, one of said input/output circuits being receptive to said remote control signal.

4. A power supply apparatus according to claim 1, wherein said control means comprises a plurality of switches for supplying electric energy therethrough to the plurality of electronic units, respectively, when the switches are turned on, and a plurality of central processing units associated with the electronic units, respectively, for turning on said switches, successively at different times corresponding to said different time delays.

5. A system comprising:
    a matrix formed of a plurality of display monitors arranged mutually proximate each other for displaying an image;
    a main power supply switch for supplying electrical energy to said plurality of display monitors;
    each of said plurality of display monitors including a respective encoder operable by a user of the system for establishing a different index number for each of said plurality of monitors;
    receiving means for receiving a remote control signa; and
    control means connected to each encoder for setting different time delay corresponding to each respective different index number and being responsive to said remote control signal for supplying the electric energy from said main power supply switch to energize each of said plurality of display monitors at different successive times corresponding to said different respective index numbers.

6. A system according to claim 5, wherein said receiving means of the respective display monitors comprise a plurality of interconnected input/output circuits, respectively, one of said input/output circuits being receptive to said remote control signal.

* * * * *